United States Patent Office 3,500,177
Patented Mar. 10, 1970

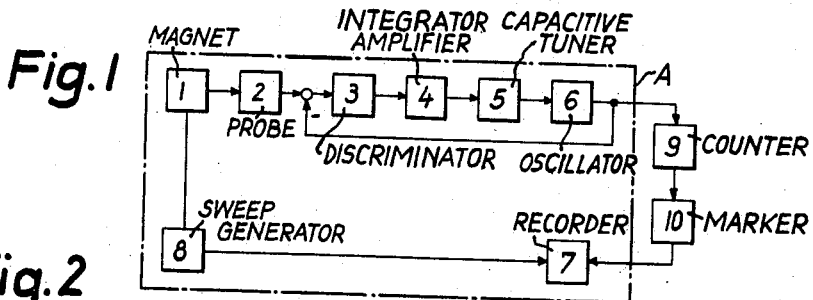
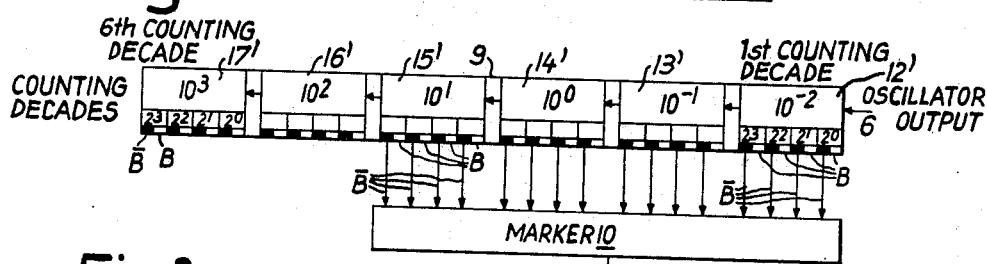
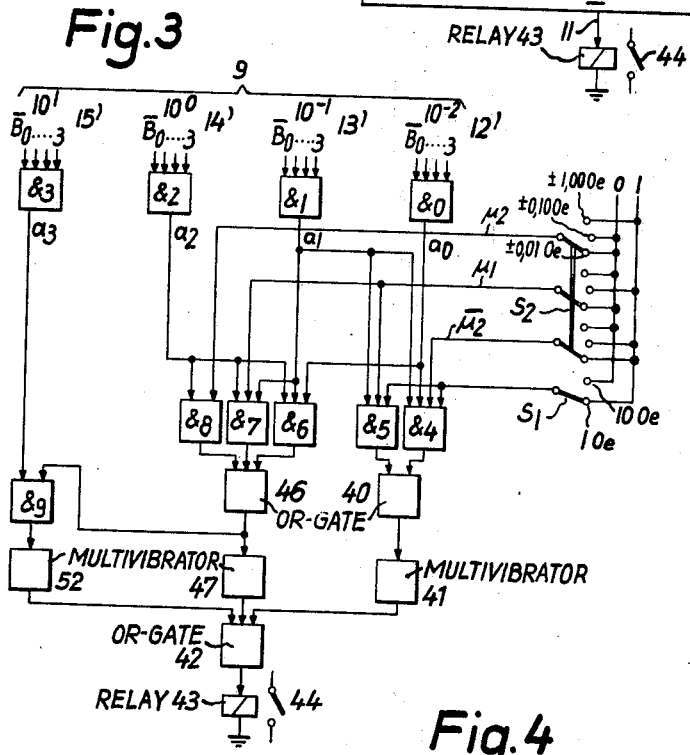

3,500,177
APPARATUS PRODUCING CALIBRATION MARKS FOR A SWEPT MAGNETIC FLUID
Horst Winterhoff, Berlin, Germany, assignor to Licentia Patent-Verwaltungs-G.m.b.H., Frankfurt am Main, Germany
Filed Sept. 14, 1966, Ser. No. 579,246
Claims priority, application Germany, Sept. 14, 1965, 1,281,577
Int. Cl. G01n 27/00
U.S. Cl. 324—.5               8 Claims

ABSTRACT OF THE DISCLOSURE

Apparatus which measures magnetic fields and produces calibration marks indicative of changing magnetic fields. The frequency of a variable frequency oscillator is changed in accordance with the strength of the field being measured. A counting means is combined with such oscillator to receive a series of electrical signal combinations, which indicate the frequency of the oscillator. A logic circuit responsive to the signal combinations from the oscillator is also provided; such logic circuit pulses at intervals determined by the oscillator. The intervals between pulses represent magnetic field strength and means are provided for correlating the pulses with time to produce an indication of magnetic field strength.

---

The present invention relates to magnetic field measurements.

More particularly, the present invention relates to a method and apparatus for measuring magnetic fields and producing an easily readable record corresponding to the magnetic field variations.

In the publication "AEG-Mitteilungen," volume 53 (1963) ⅞, pages 277–283, there is provided a description for the measuring and regulation of magnetic fields. The measuring results may be evaluated by a magnetic field reference marking measuring device. If the registering device used is, for example, a recorder, a plurality of pulses can be provided as part of the measuring results whereby the distance between the pulses is a measure of or determines the strength of the magnetic field.

In accordance with the cited publication, the production of the magnetic field reference or calibrating marks is produced by an oscillating beat method. The changing magnetic field strength is assigned a nominal or reference value and the frequency of a nuclear magnetic resonance field (NMR) measuring device is adjusted to this nominal value. The magnetic field reference mark scale is produced by a spectrum generator which produces a linear spectrum with adjustable frequency intervals.

The spectrum generator and the field measuring device are connected to a mixing stage, the output of which produces a series of zero beats. The resulting beat frequencies are applied to a band pass filter, an amplifier stage and a rectifier stage. When the frequency proportional to the magnetic field strength approaches the frequency of the spectrum a zero beat is provided which causes the signal voltage to pass through zero. This switches a trigger circuit and produces a pulse. The trigger circuit returns to its original position due to the production of the direct current voltage produced by the signal voltage after it has passed through zero.

The above described conventional methods for producing the magnetic field reference scales require a substantial investment and expensive equipment since they use spectrum generators, mixing stages, pass band filters, amplifier stages, rectifier stages, and trigger circuit. A further disadvantage of such arrangements is that they do not produce the exact zero beat frequency since the production of the marking pulses follows the passage of the voltage through zero.

By changes of the beat frequency, the operation of the trigger circuit can also vary and may completely fail, so that there will be no reference marks produced at all. Some difficulties have also been encountered in the use of the spectrum generator. Such generator must produce all of the frequencies in its output with very stable frequency and amplitude conditions in order to avoid the production of reference marks having different amplitudes. Furthermore, in the known method, by choosing preselected frequency intervals for the reference marks, it is not always possible to suppress unwanted additional marks. These disadvantages must be avoided.

The present invention overcomes these difficulties by doing away with the beat requency methods for producing the magnetic field reference marking measuring scales and produces these scales only by using frequencies proportional to the magnetic field strength.

It is, accordingly, an object of the present invention to provide a new and improved method and apparatus for measuring magnetic fields.

A second object of the present invention is to provide a new and improved method for measuring magnetic fields by using frequencies proportional to the magnetic field strength.

A further object of the present invention is to provide a new and improved method and apparatus for measuring a magnetic field by using preselected signal combinations and logic circuits.

With the above objects in view, the present invention, resides, basically, in an apparatus for measuring magnetic fields and for producing magnetic field calibration marks for changing magnetic fields, which apparatus comprises oscillator means that are operable at a variable frequency, there being means for changing the frequency of the oscillator in accordance with the strength of the magnetic field being measured. Frequency counting means are connected to receive the output signals of the oscillator for producing a series of electrical signal combinations that is a measure of the oscillator frequency. Finally, there is a logic circuit, which is responsive to the signal combinations for producing pulses at intervals determined by the frequency output of the oscillator, the intervals between pulses being a measure of the magnetic field strength, and a means for correlating the pulses with time to produce magnetic field calibration marks indicative of the magnetic field strength.

Additional objects and advantages of the present invention will become apparent upon consideration of the following description when taken in conjunction with the accompanying drawings in which:

FIGURE 1 is a block diagram of the circuit arrangement incorporating the principles of the present invention.

FIGURE 2 is a block diagram of a decade counting apparatus shown by the reference numeral 9 in FIGURE 1.

FIGURE 3 is a block diagram of the logic circuits of the marking member 10 of FIGURES 1 and 2.

FIGURE 4 is a graphic representation of the marking records produced by the apparatus of FIGURE 1.

Referring now to the drawings and more particularly to FIGURE 1, the block diagram enclosed by the dotted line A is that shown in the above mentioned literature reference. This circuit arrangement includes a magnet 1, a probe 2 of a nuclear magnetic resonance field measuring means, a discriminator 3, an integrating amplifier 4 and capacitive tuning means 5 of the oscillator 6 of the nuclear magnetic resonance field measuring equipment. In addition, the arrangement includes a recorder 7 and a sweep generator 8 which affects the recorder and the magnet 1. The frequency at the output of the oscillator 6 automatically follows the magnetic field changes.

In order to produce a magnetic field calibration mark measuring scale for the recorder 7, a countering apparatus or counter 9 is provided in accordance with the present invention. The counter 9 is controlled by the frequency of the oscillator 6. The counter 9 provides an output, for example, a binary decimal coded output and the corresponding signal combination controls a digital operating marking member 10 which produces at its output a magnetic field reference marking scale in pulse form which is applied to the recorder 7.

FIGURE 2 illustrates the principal circuit connections for the counter 9 and the marking member 10. The counter 9 includes, for example, six decades $12'-17'$. Each decade provides an output signal having four digits. Illustrated are each of the four output stages $2^0-2^3$ of each decade. The output terminals B yield the result in positive form and the output terminals $\overline{B}$ yield the complement, i.e., the result is given in negative form. The output of each decade can provide the decimal numbers 0–9 in four position signal combinations. In this way, for example, the natural binary code can be used.

The negative output signals on the terminals $\overline{B}$ of the four last decades $12'-15'$ of the counter 9 control the logic circuit of the digital marking member 10. This marking member is so constructed that, on its output conductor 11, magnetic field pulse marks in distances from 1 oe. are emitted. These pulses operate in the conventional manner, a relay 43 having a contact 44 which is connected with the recorder 7 in accordance with FIGURE 1. There, the contact 44 produces a short deflection of the pen of the recorder each time the relay 43 operates.

The marking member 10 produces, next to the magnetic field marks, which are provided in distances of 1 oe., further magnetic field marks which are provided in distances of 10 oe. and 100 oe. The marking member 10 is further constructed in such a manner that the 100 oe. field marking pulses are wider than the 10 oe. field marking pulses. These, in turn, are wider than the 1 oe. field marking pulses.

Referring now to FIGURE 3, the construction of logic circuits of the marking member 10 is shown. The negative output signals $\overline{B}_0 \ldots {}_3$ of the decades $12'-15'$ of the counter 9 control AND-gate $\&_0-\&_3$ respectively. At each of the outputs $a_0-a_3$ of these AND-gates is produced the output signal 1 only if all of the four input signals to each of the AND-gates corresponds to 1. This is the case if the digit 0 appears at the output terminals B of each of the decades $12'-15'$ of the counter apparatus of FIGURE 2, corresponding to the binary code 0000. That is, a 0 output at a B terminal produces a 1 output at a $\overline{B}$ terminal.

It can be seen in FIGURES 1 and 2 that the output of the oscillator 6 is applied to the lowest decade $12'$. After ten counts, the output of decade $12'$ is 0000 once again and a digit 1 applied to the next decade $13'$. After one hundred counts of counter 9 the output of decade $13'$ is 0000. After one thousand counts of the counter 9, the decade $14'$ has an output of 0000. After ten thousand counts, decade $15'$ has an output of 0000. At each of these respective times, the $\overline{B}$ outputs have the signal combination 1111.

As can be seen in FIGURE 3, the outputs $a_0$ and $a_1$ of the AND-gate $\&_0$ and $\&_1$ respectively are applied to an additional AND-gate $\&_4$. Also applied to this AND-gate $\&_4$ is a signal corresponding to 1 by means of a switch $S_1$ having two switching positions, 1 oe. and 10 oe. The signal 1 is, for example, produced by means of a direct voltage. The marking distance is adjustable by means of the switch $S_1$. In the position 1 oe., the marking member provides marks for a distance of 1 oe. In the position 10 oe., the marking member produces marks for distances of 10 oe. In the latter case, the AND-gate $\&_4$ would be disconnected since in the position 10 oe. of the switch $S_1$, this AND-gate $\&_4$ has a signal corresponding to 0 applied thereof.

The output of the AND-gate $\&_4$ is connected to an OR-gate 40. This OR-gate is controlled by means of a further AND-gate $\&_5$. This AND-gate $\&_5$ in turn is controlled by the signal appearing at the output $a_1$ of the AND-gate $\&_1$. Also applied to the AND-gate $\&_5$ is a signal from the switch $S_1$ and a signal from conductor $\mu_1$ which is connected by means of a switch $S_2$ at all times to the direct current source. By means of this switch, the accuracy in oe. is adjusable. In the lowest position, the adjustment is $\pm$ 1 oe.; in the middle position $\pm$ 0.1 oe. and in the upper position $\pm 0.01$ oe.

The OR-gate 40 is connected to a monostable multivibrator 41 whose output is connected to an OR-gate 42. The output of this OR-gate 42 is connected to a relay 43 whose contact 44 is operated upon energization of the relay 43.

The signals appearing at the output terminals $a_0$, $a_1$ control a further AND-gate $\&_6$. This AND-gate also has applied to it the output $a_2$ of the AND-gate $\&_2$. A further AND-gate $\&_7$ is also controlled from the signals on the output terminals $a_1$, $a_2$ and in addition from the signal on the conductor $\mu_1$.

An additional AND-gate $\&_8$ is connected to the signal on the output conductor $a_2$ and is further controlled by the signal on the conductor $\mu_2$.

The outputs of the three AND-gates $\&_6-\&_8$ are connected to an OR-gate 46 which controls a monostable multivibrator 47 whose time constant is different from the time constant of the monostable multivibrator 41. The output of the monostable multivibrator 47 is applied to the OR-gate 42.

The output of the OR-gate 46 is applied in addition, to AND-gate $\&_9$ which is also controlled by the output $a_3$ of the AND-gate $\&_3$. Also connected to the AND-gate $\&_9$ is a monostable multivibrator 52 whose time constant is additionally different from the time constants of the respective monostable multivibrators 41 and 47. The output of the monostable multivibrator 52 is also connected to the OR-gate 42.

As above indicated, the AND-gate $\&_0$ provides a signal 1 on its output terminal $a_0$ for every tenth counting step. Similarly, the AND-gate $\&_1$ provides on its output terminal $a_1$ a signal 1 for each hundred counting steps of the counter 9.

If the switches $S_1$ and $S_2$ are arranged in their illustrated positions, then on two of the inputs of the AND-gate $\&_4$ there will appear the signals 1. The third input to the AND-gate $\&_4$ is connected to the output $a_0$ of the AND-gate $\&_0$. At each tenth counting step, the signal 1 appears on the output $a_0$.

Accordingly, the AND-gate $\&_4$ will provide the output signal 1 after one hundred counting steps, this is due to the output signal 1 on the output $a_1$ of the AND-gate $\&_1$. That is, the output conductor $a_1$ is the fourth input to the AND-gate $\&_4$ and when this becomes 1, all four inputs to the AND-gate 4 will be 1 fulfilling the condition for an output from the AND-gate. That is, it is clear that at the hundredth counting step the output 1 from the AND-gate $\&_1$ will occur at the same time that a tenth counting step will appear on the output $a_0$ from AND-gate $\&_0$.

The output from the AND-gate $\&_4$ is applied to the OR-gate 40. Thus, a signal corresponding to the digit 1 is applied to the OR-gate 40 which, in turn, applies a signal to the monostable multivibrator 41. The monostable multivibrator 41 will be operated into its unstable state and will return back to its single stable state upon the application of the signal to its input. The output of the multivibrator 41 will thus become positive or correspond to the signal 1 for the time period controlled by the RC time constant of the multivibrator. This output is applied to the input of the OR-gate 42 which, in turn, applies the same to the relay 43, thereby energizing the relay for the time period controlled by the multivibrator 41.

As pointed out above, when the relay 43 is energized, closing its contact 44, the recorder 7 of FIGURE 1 is operated so that, on the graph of the recorder 7 a small pulse is indicated.

After the next hundred counting steps, the outputs $a_0$ and $a_1$ from the AND-gates $\&_0$ and $\&_1$ will again have the output signal 1 thereon and the entire process will be repeated so that the relay 43 will again be operated for the time period corresponding to the time constant of the multivibrator 41. This will occur for each hundred counting steps of the counter 9. The distance between each mark corresponding to each hundred counting steps equals 1 oe.

It can be seen that the production of the magnetic field reference marks is due solely to the operation of the AND-gates $\&_0$, $\&_1$, $\&_4$ and the relay 43. The remaining elements in FIGURE 3 are provided for the purpose of producing measure indications of tens and hundreds of an oe. In order to produce the marks corresponding to ten oe., the switches $S_1$ and $S_2$ remain in the same illustrated positions. It can be seen that the AND-gate $\&_6$ has three inputs applied thereto. One corresponds to the output $a_0$ of the $\&_0$ AND-gate and the second corresponds to the output $a_1$ of the AND-gate $\&_1$. The third input to the AND-gate $\&_6$ is the output $a_2$ of the AND-gate $\&_2$. As before the AND-gate $\&_6$ will have an output signal 1 occurring therefrom when all the inputs to the AND-gate is 1. Since the output from the AND-gate $\&_2$ provides a 1 output signal for every thousand counting steps of counter 9 it is clear that all three inputs to the AND-gate $\&_6$ will be one for each thousand counting steps.

The output of the AND-gate $\&_6$ is applied to the OR-gate 46 and from there to the multivibrator 47. The monostable multivibrator 47 will be operated into its unstable state and back to its stable state for a time period corresponding to its respective RC time constant. As mentioned above, the time constant of the multivibrator 47 is longer than the time constant of the multivibrator 41 and thus the output of the multivibrator 47 will have the signal 1 occurring for a longer time period. This output signal is applied to the OR-gate 42 and energizes the relay 43 for the longer time period corresponding to the operation of the multivibrator 47. This will produce on the graph of the recorder 7 of FIGURE 1, a marking pulse which is wider than the marking pulse produced by the operation of the multivibrator 41.

This can best be seen in FIGURE 4 where the marks 48 correspond to each 1 oe. due to the multivibrator 41 while the mark 49 occurring every 10 oe. is due to the operation of the multivibrator 47. In the illustrated indications in FIGURE 4, the marks 48 are separated by 1 oe. and the center marks shown are 3104.00 oe. The marks 49 occur every ten of the marks 48. Thus, the mark 49 is illustrated as 3110.00 oe.

If the production of marking signals having distances of 1 oe. is satisfactory, it is clear that the AND-gates $\&_2$, $\&_3$ and any additional AND-gates and the elements controlled by these AND-gates as well as the multivibrators 47 and 52 can be dispensed with.

If it is desired to register only the marks in the positions corresponding to 10 oe., that is only the marks 49, the switch $S_1$ can be moved into its upper position marked 10 oe. Under these circumstances, the digit 0 is applied to the inputs of the AND-gates $\&_4$ and $\&_5$ at all times. Thus, these AND-gates will be inoperative and the multivibrator 41 will not be energized. However, the multivibrator 47 will still be energized as before from the outputs of the AND-gates $\&_0$, $\&_1$ and $\&_2$. Thus, only the marks 49 will be produced by the recorder 7 in FIGURE 1 as operated by the energized relay 43.

Referring again to FIGURE 4, the marking information produced by the recorder 7 of FIGURE 1 is illustrated. In this drawing, the marks corresponding to 3099 oe. through 3201 oe. are illustrated. For every distance corresponding to 1 oe., narrow pulses are produced such as that shown by the pulse 48. For the every tenth oe. marking, a wider pulse 49 is shown. Finally, for every 100 oe., the kidest marking pulses 51 are illustrated. It can be seen that the marking pulses 51 correspond to the marks 3100.00 oe. and 3200.00 oe. respectively.

In FIGURE 3, the production of the marking pulses 51 will be explained. The AND-gate $\&_3$ produces on its output $a_3$ a signal 1 for every 10,000 counting steps of the counter 9 of FIGURE 1. This is applied to the AND-gate $\&_9$. The second input to the AND-gate $\&_9$ is the output from the OR-gate 46. The output from the OR-gate 46 will have the signal 1 thereon at every thousand counting steps as indicated above. Thus, every ten thousand counting steps, both inputs to the AND-gate $\&_9$ will be 1 and the output used to switch the multivibrator 52 from its stable to its unstable state. As mentioned above, the RC time constant of the multivibrator 52 is longer than either of the time constants of multivibrators 41 and 47. Thus, this will energize the relay 43 by means of the OR-gate 42 for a time period corresponding to this longest time constant. The recorder 7 will accordingly operate to produce the widest marks 51 on the record of FIGURE 4.

From the above, it is clear how the markings can be made for the units, tens and hundreds digits.

In FIGURE 3, the switch $S_2$ can be used for adjusting the accuracy of the pulses for the sweep velocity. For example, in the illustrated position the switch $S_2$ applies a signal 0 to the AND-gates $\&_5$, $\&_7$ by means of conductor $\mu_1$ to maintain these AND-gates in operative condition.

On the other hand, the AND-gate $\&_4$ has input signal 1 applied thereto since, in the illustrated position of the switch $S_2$, the conductor $\bar{\mu}_2$ apply such signals thereto. If the switch $S_2$ is operated to its middle illustrated position, it can be seen that the digit 1 will be applied to the conductor $\mu_1$. Thus, the AND-gate $\&_5$ will be rendered operative. Under these circumstances, the AND-gate $\&_5$ will operate each time a signal 1 appears on the output conductor $a_1$ of the AND-gate $\&_1$. Thus, the relay 43 will operate without the time coincidence with the AND-gate $\&_0$.

In the upper position of the switch $S_2$, the AND-gate $\&_8$ will be rendered operative by the 1 signal applied on the conductor $\mu_2$. Under these conditions, the AND-gate $\&_8$ will be operated by the output on the conductor $a_2$ each time this output is 1. This occurs every thousand counting pulses. The distance between the marks is 10 oe. with an accuracy of $\pm 1$ oe.

It will be understood that the above description of the present invention is susceptible to various modifications, changes, and adaptations, and the same are intended to be comprehended within the meaning and range of equivalents of the appended claims.

What is claimed is:

1. In a nuclear resonance spectrometer system which includes means for producing a swept magnetic field, an apparatus for measuring the swept magnetic field and for producing magnetic field calibration marks for the magnetic field, the combination which comprises:
    (a) oscillator means operable at variable frequency;
    (b) means for maintaining the frequency of said oscillator proportional to the strength of the swept magnetic field being measured;
    (c) frequency counting means connected to receive the output signals of said oscillator for producing a series of electrical signal combinations in dependence upon the frequency of said output signals;
    (d) a logic circuit responsive to said signal combinations for producing pulses at intervals determined by the frequency output of said oscillator, the intervals between pulses representing a fixed change in said swept magnetic field strength;

(e) means connected to said logic circuit for correlating said pulses with the output of the spectrometer system to produce magnetic field calibration marks which indicate the oscillator frequency, hence the magnetic field strength.

2. An apparatus in accordance with claim 1, wherein said correlating means is a recorder for recording the pulses produced by said logic circuit.

3. An apparatus in accordance with claim 2 wherein a monostable multivibrator is provided responsive to the pulse emitted by said logic circuit, said multivibrator being operated into its unstable state and back to its stable state for each such pulse and thereby controlling the time period for recording said pulse.

4. An apparatus in accordance with claim 3 wherein a plurality of said monostable multivibrators is provided, each of said multivibrators having a different time constant.

5. An apparatus in accordance with claim 2 wherein means are provided for suppressing selected pulses by disabling portions of said logic circuit.

6. In a nuclear resonance spectrometer system which includes means for producing a swept magnetic field, an apparatus for measuring the swept magnetic field and for producing magnetic field calibration marks for the magnetic field, the combination which comprises:

(a) oscillator means operable at variable frequency;

(b) means for maintaining the frequency of said oscillator proportional to the strength of the swept magnetic field being measured;

(c) frequency counting means connected to receive the output signals of said oscillator for producing a series of electrical signal combinations in dependence upon the frequency of said output signals;

(d) a logic circuit responsive to said signal combinations for producing pulses at intervals determined by the frequency output of said oscillator, the intervals between pulses representing a fixed change in said swept magnetic field strength, the widths of said produced pulses being different for every tenth and every hundredth pulse produced by said logic circuit;

(e) means connected to said logic circuit for correlating said pulses with the output of the spectrometer system to produce magnetic field calibration marks which indicate the oscillator frequency, hence the magnetic field strength.

7. In a nuclear resonance spectrometer system which includes means for producing a swept magnetic field, an apparatus for measuring the swept magnetic field and for producing magnetic field calibration marks for the magnetic field, the combination which comprises:

(a) oscillator means operable at variable frequency;

(b) means for maintaining the frequency of said oscillator proportional to the strength of the swept magnetic field being measured;

(c) frequency counting means connected to receive the output signals of said oscillator for producing a series of electrical signal combinations in dependence upon the frequency of said output signals, said counting means having a plurality of decades corresponding to different orders respectively;

(d) a logic circuit responsive to said signal combinations for producing pulses at intervals determined by the frequency output of said oscillator, the intervals between pulses representing a fixed change in said swept magnetic field strength, said logic circuit emitting a pulse whenever the signal combination in the two lowest order decades corresponds to the digit 0;

(e) means connected to said logic circuit for correlating said pulses with the output of the spectrometer system to produce magnetic field calibration marks which indicate the oscillator frequency, hence the magnetic field strength.

8. An apparatus in accordance with claim 7 wherein said logic circuit emits a pulse each time the signal combination representing the digit 0 appears in each of the next higher order decades.

References Cited

UNITED STATES PATENTS

| | | | |
|---|---|---|---|
| 3,103,622 | 9/1963 | Millership | 324—0.5 |
| 3,260,926 | 7/1966 | Coles | 324—0.5 |
| 3,297,860 | 1/1967 | Weiss | 324—0.5 |

RUDOLPH V. ROLINEC, Primary Examiner

M. J. LYNCH, Assistant Examiner